(12) United States Patent
Hollatz

(10) Patent No.: US 7,778,405 B2
(45) Date of Patent: Aug. 17, 2010

(54) CONTACT CENTER SYSTEM INDEPENDENT OF LINE KEY STATUS OR CURRENT AGENT ACTIVITY/STATE

(75) Inventor: Mike Hollatz, Huntley, IL (US)

(73) Assignee: Aspect Software, Inc., Lombard, IL (US)

( * ) Notice: Subject to any disclaimer, the term of this patent is extended or adjusted under 35 U.S.C. 154(b) by 1164 days.

(21) Appl. No.: 10/999,403

(22) Filed: Nov. 30, 2004

(65) Prior Publication Data
US 2006/0115073 A1    Jun. 1, 2006

(51) Int. Cl.
*H04M 3/00* (2006.01)
(52) U.S. Cl. .............................. 379/265.02; 379/265.09; 705/5; 709/206
(58) Field of Classification Search ................................. 379/265.02–266.08, 265.01–266.1, 223; 709/228, 206; 705/5, 228
See application file for complete search history.

(56) References Cited

U.S. PATENT DOCUMENTS

| | | | |
|---|---|---|---|
| 5,014,303 A * | 5/1991 | Velius .................... | 379/266.01 |
| 5,555,179 A | 9/1996 | Koyama et al. | |
| 5,765,033 A | 6/1998 | Miloslavsky | |
| 5,784,452 A | 7/1998 | Carney | |
| 5,832,451 A * | 11/1998 | Flake et al. .................... | 705/5 |
| 5,841,854 A | 11/1998 | Schumacher et al. | |
| 5,926,539 A | 7/1999 | Shtivelman | |
| 5,940,496 A | 8/1999 | Gisby et al. | |
| 5,946,387 A | 8/1999 | Miloslavsky | |
| 5,953,332 A | 9/1999 | Miloslavsky | |
| 5,953,405 A | 9/1999 | Miloslavsky | |
| 5,987,115 A | 11/1999 | Petrunka et al. | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Macleod Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,408,064 B1 | 6/2002 | Fedorov et al. | |
| 6,574,331 B1 | 6/2003 | Forsythe et al. | |
| 6,704,404 B1 | 3/2004 | Burnett | |
| 6,732,156 B2 | 5/2004 | Miloslavsky | |
| 7,000,019 B2 * | 2/2006 | Low et al. .................... | 709/227 |
| 7,085,367 B1 * | 8/2006 | Lang ..................... | 379/265.06 |
| 2003/0174831 A1 * | 9/2003 | Dezonno et al. ........ | 379/265.02 |

(Continued)

*Primary Examiner*—Gerald Gauthier
(74) *Attorney, Agent, or Firm*—Husch Blackwell Sanders Welsh Katz

(57) ABSTRACT

A method and apparatus are provided for controlling a plurality of contacts with respective clients on a terminal of an agent of an organization. The method includes the steps of setting up the plurality of contacts with the respective clients under an Internet protocol and simultaneously displaying a respective line softkey of each contact of the plurality of contacts on a terminal of the agent where the respective line softkey depicts a status of the contact.

34 Claims, 1 Drawing Sheet

U.S. PATENT DOCUMENTS

2004/0054743 A1* 3/2004 McPartlan et al. .......... 709/206
2004/0057570 A1* 3/2004 Power et al. ........... 379/265.13
2005/0238162 A1* 10/2005 Dezonno ............... 379/265.09
2006/0023866 A1* 2/2006 Dezonno ............... 379/265.09

* cited by examiner

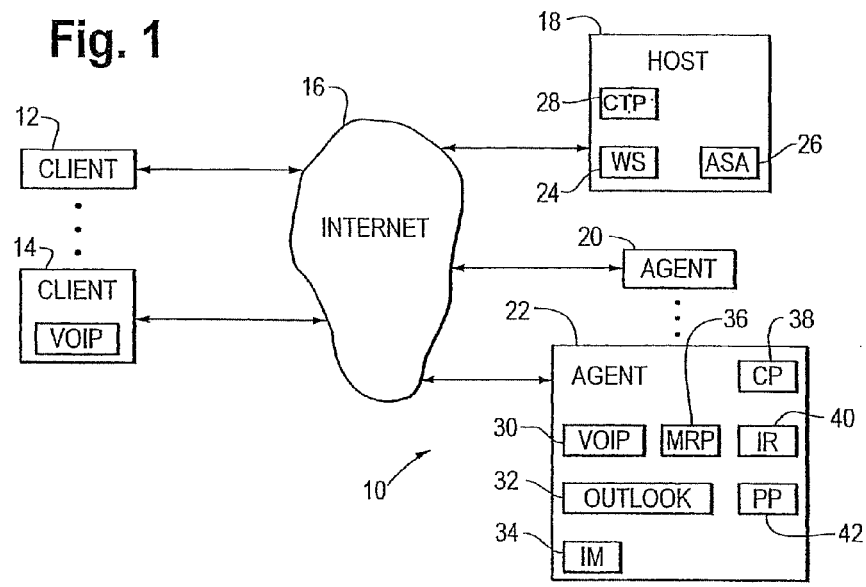
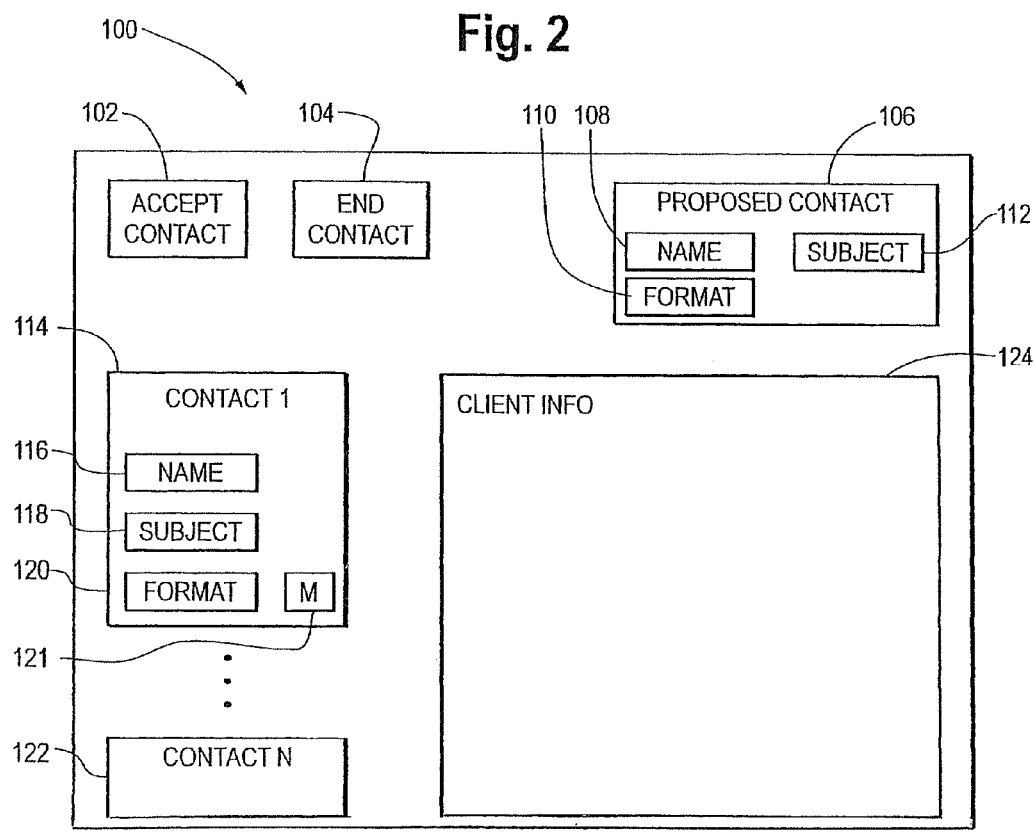

CONTACT CENTER SYSTEM INDEPENDENT OF LINE KEY STATUS OR CURRENT AGENT ACTIVITY/STATE

FIELD OF THE INVENTION

The field of the invention relates to communication systems and more particularly to automatic call distributors.

BACKGROUND OF THE INVENTION

Automatic call distributors (ACDs) are known. Such systems are typically used by organizations to serve large numbers of callers. Typically, calls are directed to a common telephone number and distributed to agents based upon some criteria (e.g., agent idle time).

ACDs can typically process both inbound and outbound calls. Typically, a controller monitors a workload of its agents. Where a workload of received calls fall below some threshold value, the controller may begin to initiate outbound calls.

In addition to placing and distributing calls, an ACD may also identify and display documents on agent terminals as an aid to processing the calls. In the case of incoming calls, the calls may be received along with dialed number identification service (DNIS) and/or automatic number identification (ANI) information. ANI may be used to identify a caller at the same instant as the call is delivered to the ACD. The controller of the ACD may use the ANI information to retrieve and display customer records on a terminal of the agent selected to handle the call at the same instant that the call is delivered to the agent.

In addition, textual information may be displayed on a terminal of the agent that guides the agent through a sales presentation. DNIS information may be used to identify an intended call target and to select an appropriate sales presentation for use by the agent based upon the intended call target.

While automatic call distributors work relatively well, they are not particularly well suited to the Internet environment. Further, the processes that are used for handling switched circuit calls within the PSTN cannot be used within the Internet where processing elements may be widely separated. Because of the widely separated nature of Internet call processing, a need exits for a method of handling calls at agent workstations that is adaptable to the Internet environment.

SUMMARY OF THE INVENTION

A method and apparatus are provided for controlling a plurality of calls with respective clients on a terminal of an agent of an organization. The method includes the steps of setting up the plurality of contacts with the respective clients under an Internet protocol and simultaneously displaying a respective line softkey of each contact of the plurality of contacts on a terminal of the agent where the respective line softkey depicts a status of the contact.

BRIEF DESCRIPTION OF THE DRAWINGS

FIG. 1 is a block diagram of a contact distribution system under an illustrated embodiment of the invention; and FIG. 2 is a display that may appear on a terminal of an agent of the system of FIG. 1.

DETAILED DESCRIPTION OF AN ILLUSTRATED EMBODIMENT

FIG. 1 is a block diagram of an Internet based automatic contact distributor 10 under an illustrated embodiment of the invention. Under the illustrated embodiment, Internet contacts may be processed by the host 18 and delivered to agents 20, 22 of the organization using the resources of the contact distributor 10.

In general, the system 10 may be used by any of a number of different enterprise organizations (e.g., commercial, environmental, political, etc.) to advance the agenda of the enterprise. In order to advance the agenda of the organization, the organization may publish (by advertising or otherwise) one or more universal resource locators (URLS) or universal resource indicators (URI) that allow clients 12, 14 to contact the organization through the internet. The URLs or URIs may be an e-mail address, an instant messaging (IM) address or an identify of a website 24 through which clients 12, 14 may download information.

As each contact arrives at (i.e., is established with) the website 24, a contact processor 28 may open a contact file to track a history of the contact. The contact processor 28 may retrieve a source URL or URI that identifies the client 12, 14 from the website access request. As the client 12, 14 browses the website 24, the contact processor 28 may add identifiers of any webpages visited to the contact file.

Included on some or all of the webpages provided by the website 24 may be a SPEAK WITH AGENT softkey. Activation of the SPEAK WITH AGENT softkey may cause the contact distributor to connect the contact with an agent 20, 22.

Alternatively, the organization may purchase lists of URLs or URIs that allow the organization to contact the clients 12, 14 directly. Direct contact in this case may mean sending e-mails to the client 12, 14, posting ads to the client 12, 14 or sending instant messages (IMs) to the client 12, 14 soliciting a response.

In the case of outgoing contacts, the contact processor 28 may open a file that includes a URL or URI of the client. The content of any message sent to the client 12, 14 may also be included within the file.

Contacts may be determined to be active when a response is received to an outgoing contact or a SPEAK WITH AGENT softkey is activated. In either case, the host 18 may assign the contact to an agent 20, 22.

In order to assign active contacts to agents 20, 22, the host 18 may transfer the contact file to an agent selection application 26. As a first step in selecting an agent 20, 22, the agent selection application 26 may determine a subject matter of the contact. Determination of the subject matter of the contact may be made based upon the content of the contact file.

Selection of an agent 20, 22 may be based upon a comparison of the content of the contact file with a skills list associated with each agent 20, 22. In this regard, when the content of the contact file substantially matches the skills list of one or more agents 20, 22, the contact may be assigned to one or simultaneously to all of the agents that meet the skills requirements of the contact.

Turning now to the agents 20, 22, each agent 20, 22 may be provided with a messaging application 30, 32, 34 for each message type (Internet protocol) that the agent 20, 22 will handle. A first application 30 may be provided for exchanging audible information with a client 12, 14 under a voice-over-Internet-protocol (VoIP) format. An OUTLOOK application 32 may be provided for processing e-mails and an IM application 34 may be provided for instant messaging.

FIG. 2 may depict a contact control screen 100 that appears on a terminal of an agent 20, 22 for control of contacts. As shown, a contact accept softkey 102 may be provided that allows the agent 20, 22 to accept a contact.

As each contact is assigned to a selected agent 20, 22, the contact file may be sent to the agent 20, 22. The contact file may be stored in a contact list in memory of the terminal 20, 22.

A PROPOSED CONTACT window 106 may be provided that summarizes the contact to the agent 20, 22 based upon the information in the contact file before the agent 20, 22 accepts the contact. As shown, a name 108 of the client 12, 14, a subject matter 112 and a format 110 of the contact may appear to the agent 20, 22 in a respective window 106 before acceptance of the contact. The proposed contact window 106 may allow the agent 20, 22 to screen contacts for a desirable subject matter or to select a communication format 110 that the agent 20, 22 is most comfortable with at that instant of time.

When the agent 20, 22 accepts a contact by activating the ACCEPT CONTACT softkey 102, the information from the contact may be transferred by a connection processor 38 from the PROPOSED CONTACT window 106 to a PENDING CONTACT display and softkey combination (hereinafter a display/softkey or line softkey) 114. In addition to indicating acceptance by the agent 20, 22 of the contact, the PENDING CONTACT display/softkey may also be highlighted with an appropriate color (e.g., red, green, etc.) by the connection processor 38 to indicate an open channel status (active contact) with the client 12, 14. The highlighting of the PENDING CONTACT display/softkey 114 may alert the agent 20, 22 that any client information appearing in the interactive window 124 relates to the client 12, 14 identified within the name field (window) 116. The subject window 118 and format window 120 may also confirm the format of use within the interactive client information window 124 (e.g., IM, e-mail, etc.). In addition to highlighting the active PENDING CONTACT display 114, 122, the connection processor 38 may also cause the softkey 114, 122 to flash under control of a timer 40.

An open channel in this context means that any message sent by the agent 20, 22 may be communicated through the open channel to the client 12, 14. For example, if the channel is VoIP, then any words spoken by the agent 20, 22 during that time period will be heard by the client 12, 14.

Once a contact has been accepted, the agent 20, 22 may converse with the client 12, 14 under any appropriate format (e.g., VoIP, e-mail, IM, etc.). If the client 12, 14 is somewhat slow in responding to the agent's messages or the agent 20, 22 should find that he/she can handle more than one contact at a time, then the agent 20, 22 may activate the ACCEPT CONTACT softkey 102 (while the first contact is still in progress) to accept another contact. When the agent 20, 22 accepts another contact, the contact that formerly occupied the first PENDING CONTACT display/softkey 114 (now an inactive contact) may be moved down one position. It should be noted in this regard that any number of PENDING CONTACT display/softkeys 114, 122 may be provided limited only by the agent's ability to handle multiple contacts. It may also be noted in this regard that the agent 20, 22 may switch back and forth between contacts (to make a formerly inactive contact active and visa versa) by manually activating a PENDING CONTACT display/softkeys 114, 122.

In order to control operation of the contacts, the connection processor 38 monitors the PENDING CONTACT softkeys 114, 122. When the connection processor 38 detects activation of a PENDING CONTACT softkey 114, 122 that is not the currently open channel, the connection processor 38 closes the previously open channel and opens the channel (i.e., activates the contact) that is associated with the softkey 114, 122 that has been most recently activated.

To help the agent 20, 22 in the case of multiple contacts, a flashing MESSAGE RECEIVED status display 121 may be provided. In this case, a message received processor 36 may monitor each pending (inactive) contact for activity. If a message is received or a voice is detected on an incoming voice channel the MESSAGE RECEIVED display 121 is activated to prompt the agent 20, 22 that this contact needs attention. A received message memory may save any spoken words until the PENDING CONTACT display/softkey 114, 122 is again activated, at which time the spoken words are repeated from memory or the text is displayed in the box 124. In this regard, the connection processor 38 within the agent terminal 20, 22 may monitor the respective PENDING CONTACT display/softkeys 114, 122 and switch the open connection among clients 12, 14 as directed by the agent.

In addition, the highlighting of the PENDING CONTACT display/softkey 114, 122 may be time and color coded based upon a relative priority of a call. The PENDING CONTACT display/softkey 114, 122 of the open channel may be time encoded by causing the highlighting to flash at a predetermined rate determined by the priority of the call. The PENDING CONTACT display/softkey 114, 122 may be color coded with a priority indicator.

In addition, the priority of the individual contacts may require service at certain minimum rates. For example, VoIP contacts may require frequent service (e.g., every five seconds) while IMs may require service less frequently (e.g., every ten seconds). E-mails may require service even less frequently (e.g., once every one-h hour).

A priority processor 42 may track activation of each contact to ensure that each contact is serviced in accordance with its relative priority level. When a contact has not been serviced within the required predetermined time period, the message light 121 may be activated to prompt the agent 20, 22.

A specific embodiment of method and apparatus for controlling a plurality of contacts with respective clients on a terminal of an agent of an organization has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of controlling a plurality of contacts between an assigned agent and a plurality of respective clients on a terminal of the assigned agent of an organization comprising:

setting up a plurality of simultaneous contacts made up of at least one contact with each of the respective clients under an Internet protocol;

simultaneously displaying a respective line display/softkey of each client of the plurality of clients where the respective line display/softkey depicts a status of the contact with the client;

opening a previously inactive contact in response to activation of the respective line display/softkey of the previously inactive contact;

storing in memory any spoken words of an incoming inactive contact of the plurality of contacts with the assigned agent when another contact is active and playing the stored spoken words when the incoming inactive contact is activated by the agent; and prompting the assigned agent to service each of the plurality of simultaneous contacts upon detecting that the contact has not been opened for a predetermined time period.

2. The method of depicting contact status as in claim 1 further comprising deactivating an active contact in response to opening a previously inactive contact.

3. The method of depicting contact status as in claim 1 further comprising providing a visual highlighting of an activated respective line display/softkey to indicate an open channel.

4. The method of depicting contact status as in claim 3 wherein the step of setting up comprises displaying proposed contact summaries to the assigned agent and the assigned agent accepting proposed contacts by activating an accept contact softkey.

5. The method of depicting contact status as in claim 3 wherein the visual highlighting further comprises causing the softkey of an active contact to assume a predetermined color.

6. The method of depicting contact status as in claim 1 further comprising displaying indicia of identity of each contact of the plurality of contacts in conjunction with each respective line display/softkey of the contact.

7. The method of depicting contact status as in claim 1 further comprising providing a contact accept softkey for accepting an additional contact which displays a summary of the additional contact prior to acceptance and which initiates a line display/softkey for the contact when activated.

8. The method of depicting contact status as in claim 1 further comprising displaying a subject matter of a contact of the plurality of contacts in conjunction with the respective line display/softkey of the contact.

9. The method of depicting contact status as in claim 1 further comprising displaying a priority of a contact of the plurality of contacts in conjunction with the respective line display/softkey of the contact.

10. The method of depicting contact status as in claim 9 wherein the step of displaying a priority of the contact further comprises associating a predetermined color with each softkey for each priority level and tracking each contact to ensure the contact is serviced in accordance with a respective relative priority.

11. The method of depicting contact status as in claim 1 further comprising prompting the agent when a message has been received by the terminal from an inactive contact of the plurality of contacts.

12. The method of depicting contact status as in claim 1 further comprising alerting the agent when a contact of the plurality of contacts has been inactive for a predetermined period of time.

13. An apparatus for controlling a plurality of contacts between an assigned agent and a plurality of respective clients on a terminal of the agent of an organization, such apparatus comprising:

means for setting up a plurality of simultaneous contacts made up of at least one contact with each of the respective clients under an Internet protocol;

means for simultaneously displaying a respective line display/softkey of each client of the plurality of clients where the respective line display/softkey depicts a status of the contact with the client;

means for opening a previously inactive contact in response to activation of the respective line display/softkey of the previously inactive contact;

means for storing any spoken words of an inactive incoming contact when another contact is active until the incoming inactive contact is activated;

means for prompting the assigned agent to service each of the plurality of simultaneous contacts upon detecting that the contact has not been opened for a predetermined time period.

14. The apparatus for depicting contact status as in claim 13 further comprising activating a respective line softkey of the plurality of contacts to open a channel with the client.

15. The apparatus for depicting contact status as in claim 13 further comprising means for providing a visual highlight of an activated respective line display/softkey to indicate an open channel.

16. The apparatus for depicting contact status as in claim 15 wherein the visual highlight further comprises means for causing the softkey of an active contact to flash.

17. The apparatus for depicting contact status as in claim 15 wherein the visual highlight further comprises means for causing the softkey of an active contact to assume a predetermined color.

18. The apparatus for depicting contact status as in claim 13 further comprising means for displaying indicia of identity of each contact of the plurality of contacts in conjunction with a respective line softkey of the contact.

19. The apparatus for depicting contact status as in claim 13 further comprising a contact accept softkey for accepting an additional contact.

20. The apparatus for depicting contact status as in claim 13 further comprising means for displaying a subject matter of a contact of the plurality of contacts in conjunction with the respective line softkey of the contact.

21. The apparatus for depicting contact status as in claim 13 further comprising means for displaying a priority of a contact of the plurality of contacts in conjunction with the respective line softkey of the contact.

22. The apparatus for depicting contact status as in claim 13 wherein the means for displaying a priority of the contact further comprises means for associating a flash rate of softkey highlighting with a priority level of the call.

23. The apparatus for depicting contact status as in claim 13 further comprising means for prompting the agent when a message is been received by the terminal from an inactive contact of the plurality of contacts.

24. The apparatus for depicting contact status as in claim 13 further comprising means for alerting the agent when a contact of the plurality of contacts has been inactive for a predetermined period of time.

25. An apparatus for controlling a plurality of contacts between an assigned agent and a plurality of respective clients on a terminal of the assigned agent of an organization, such apparatus comprising:

an agent selection application with a host that sets up a plurality of simultaneous contacts made up of at least one contact with each of the respective clients under an Internet protocol;

the agent terminal that simultaneously displays a respective line display/softkey of each client of the plurality of clients where the respective line display/softkey depicts a status of the contact with the client;

a processor which opens a previous inactive contact in response to activation of the respective line display/softkey of the previously inactive contact;

message memory which stores any spoken words of an inactive incoming contact of the plurality of contacts with the assigned agent when another contact is active until the incoming inactive contact is activated;

a priority processor that prompts the assigned agent to service each of the plurality of simultaneous contacts upon detecting that the contact has not been opened for a predetermined time period.

26. The apparatus for depicting contact status as in claim 25 further comprising activating a respective line softkey of the plurality of contacts to open a channel with the client.

27. The apparatus for depicting contact status as in claim 25 further comprising a connection processor that provides a visual highlighting of an activated respective line display/softkey to indicate an open channel.

28. The apparatus for depicting contact status as in claim 27 wherein the visual highlighting further comprises a timer that causes the softkey of an active contact to flash.

29. The apparatus for depicting contact status as in claim 25 further comprising a name window that displays indicia of identity of each contact of the plurality of contacts in conjunction with a respective line softkey of the contact.

30. The apparatus for depicting contact status as in claim 25 further comprising a contact accept softkey for accepting an additional contact.

31. The apparatus for depicting contact status as in claim 25 further comprising means for displaying a subject matter of a contact of the plurality of contacts in conjunction with the respective line softkey of the contact.

32. The apparatus for depicting contact status as in claim 25 further comprising means for displaying a priority of a contact of the plurality of contacts in conjunction with the respective line softkey of the contact.

33. The apparatus for depicting contact status as in claim 25 wherein the means for displaying a priority of the contact further comprises means for associating a predetermined color with each softkey for each priority level.

34. The apparatus for depicting contact status as in claim 25 further comprising a message received status display prompting the agent when a message is been received by the terminal from an inactive contact of the plurality of contacts.

* * * * *